(12) United States Patent
Laing (10) Patent No.: US 8,372,281 B1
(45) Date of Patent: Feb. 12, 2013

(54) SCRAPER ADJUSTMENT MECHANISM AND METHOD

(75) Inventor: David A. Laing, Elyria, OH (US)

(73) Assignee: Industrial Manufacturing Company, Brecksville, OH (US)

( * ) Notice: Subject to any disclaimer, the term of this patent is extended or adjusted under 35 U.S.C. 154(b) by 0 days.

(21) Appl. No.: 13/362,792

(22) Filed: Jan. 31, 2012

(51) Int. Cl.
*B01D 29/64* (2006.01)
*B01D 33/46* (2006.01)
(52) U.S. Cl. .................. 210/232; 210/396; 210/407
(58) Field of Classification Search ............ 210/232, 210/407, 396, 791
See application file for complete search history.

(56) References Cited

U.S. PATENT DOCUMENTS

| | | | |
|---|---|---|---|
| 148,557 A | 3/1874 | Gillespie et al. | |
| 556,725 A | 3/1896 | Farwell | |
| 740,574 A | 10/1903 | Kohlmeyer | |
| 793,720 A | 7/1905 | Godbe | |
| 1,757,153 A | 5/1930 | Thompson | |
| 2,084,955 A | 6/1937 | Naught | |
| 2,243,559 A | 5/1941 | Griffith | |
| 2,305,351 A | 12/1942 | Hellan | |
| 2,354,752 A | 8/1944 | Hellan | |
| 2,669,360 A | 2/1954 | Little | |
| 3,278,038 A | 10/1966 | Acker | |
| 3,762,563 A | 10/1973 | Petersen | |
| 5,194,160 A | 3/1993 | Simonelli et al. | |
| 5,401,396 A | 3/1995 | Lescovich et al. | |
| 5,595,655 A | 1/1997 | Steiner et al. | |
| RE35,560 E | 7/1997 | Simonelli et al. | |
| 5,865,997 A | 2/1999 | Isaacs | |
| 6,177,022 B1 | 1/2001 | Benenson, Jr. et al. | |
| 6,227,380 B1 | 5/2001 | Bacher et al. | |
| 6,517,722 B1 | 2/2003 | Benenson, Jr. et al. | |
| 6,666,976 B2 | 12/2003 | Benenson, Jr. et al. | |
| 6,676,834 B1 | 1/2004 | Benenson, Jr. et al. | |
| 6,712,981 B2 | 3/2004 | Benenson, Jr. et al. | |
| 6,821,444 B2 | 11/2004 | Benenson, Jr. et al. | |
| 6,861,004 B2 | 3/2005 | Benenson, Jr. et al. | |
| 7,258,788 B2 | 8/2007 | Pollock | |
| 7,364,662 B2* | 4/2008 | Laing et al. .................. 210/791 |
| 2002/0158005 A1* | 10/2002 | Laing ............................ 210/408 |
| 2005/0199555 A1 | 9/2005 | Pollock | |
| 2007/0114190 A1 | 5/2007 | Laing et al. | |
| 2007/0289912 A1 | 12/2007 | Pollock | |

* cited by examiner

*Primary Examiner* — Thomas M Lithgow
(74) *Attorney, Agent, or Firm* — Caesar, Rivise, Bernstein, Cohen & Pokotilow, Ltd.

(57) ABSTRACT

A scraper adjustment mechanism and method for a filter that permits an operator to adjust the distance between the scraper and a filter surface without the need to have access to the filter/scraper interface, or fasteners within the filter.

6 Claims, 8 Drawing Sheets

SCRAPER ADJUSTMENT MECHANISM AND METHOD

BACKGROUND OF THE INVENTION

1. Field of Invention

This invention relates generally to filter devices and, more particularly to filters using scrapers or similar devices for removing particulates from a filter screen or other surface.

2. Description of Related Art

It is well-known that the mechanical cleaning of a filter surface can be accomplished by having a brush or scraper drag along, or be slightly spaced from, the filter surface where deposits have accumulated. In certain configurations, the brush or scraper is mounted at one end between two walls but with a significant portion of the brush or scraper projecting beyond the walls. Such configurations are shown in U.S. Pat. Nos. 148,557 (Gillespie et al.); 556,725 (Farwell); 740,574 (Kohlmeyer) and 793,720 (Godbe). In conventional filter systems, the particulate contaminants are driven off the filter surface and are deposited in a hopper or tank along with some of the fluid being filtered.

Scraper edges are prone to wear over time and therefore it is necessary to periodically adjust the relative position of the scraper edge with the filter surface. In some cases, it is desirable to make such adjustments without compromising or breaking the pressure boundary in the system being filtered by opening a hatch or access panel to reach the filter. This may become more complicated where such scrapers are used with filter assemblies for cleaning fuel oil in ships (see for example, U.S. Pat. Nos. 6,177,022 (Benenson, Jr. et al.); 6,517,722 (Benenson, Jr. et al.); 6,821,444 (Benenson, Jr., et al.)) because the fuel oil system is a critical system and as such the filter assemblies therein cannot be removed from service or otherwise opened for scraper adjustment.

Moreover, prior to placing the filter into service it often is necessary to initially set the position of the scraper edge a preset distance relative to the filter surface. It is desirable or beneficial to be able to provide this latter function without removal of any components, e.g., inspection port cover, of the filter system.

Laing et al. U.S. Pat. No. 7,364,662, assigned to the assignee of the present application, discloses a relatively complex, externally adjustable scraper arrangement whereby an inspection cover closes an inspection port and external adjustment tie rods are employed to transversely adjust the position of the scraper blades relative to the outer surface of a strainer surface. In the Laing et al. '662 construction, a separate wedge member is employed as part of the adjusting system to provide a balanced loading on the scraper blade, regardless of the direction of rotation of the filter assembly.

U.S. Pat. No. 740,574, issued to Kohlmeyer on Oct. 6, 1903, also discloses an adjustable scraper system which can be externally adjusted from outside of the chamber carrying rotating filter elements. The arrangement employed in the Kohlmeyer construction is relatively complex.

Steiner et al. U.S. Pat. No. 5,595,655 discloses a system for adjusting a scraper member (e.g. 108) by actuation of spaced apart bolts 115 designed to engage scraper plate 119 captured between the scraper 108 and shoe 114 (see FIGS. 2-4). The Steiner et al. system does not include any provision for backing the scraper blade off of the strainer surface. In other words, the system is only designed to move the scraper blade closer to the strainer surface to thereby permit adjustment of the scraper blade necessitated by wear of the blade. Moreover, the adjusting mechanism is located internally of the outer strainer housing. Therefore, external adjustment of the scraper blade cannot be achieved.

Thus, there remains a need and/or desire for a simple and reliable system permitting either initial adjustment or periodic adjustment of the scraper position in a filter assembly without the need to have access to the scraper/filter interface and without having to depressurize the filter assembly. It is to such a simplified system that the present invention relates.

All references cited herein are incorporated herein by reference in their entireties.

BRIEF SUMMARY OF THE INVENTION

A scraper adjustment mechanism for adjusting the distance between an edge of a scraper and a filter assembly surface positioned in a filter assembly housing including an inspection port and an inspection cover comprising a projection that passes through the inspection port when the cover is installed at the inspection port. The inspection cover includes a plurality of passageways and at least a pair of elongate tie bars extending through respective passageways and being slideably movable therein. The pair of tie bars each includes a proximal end and a distal end. The proximal end of each of said pair of tie bars is closest to an outer surface of the filter assembly housing and the distal end of each of the pair of tie bars is closest to the filter assembly surface. An adjustment mechanism is included at the proximal end of each of the pair of tie bars and is actuatable by rotation in opposite directions from outside of the filter assembly housing without removal of the inspection cover. Rotation in one direction moves the tie bars in a direction outwardly of the housing in a direction away from the filter assembly surface and rotation in an opposite direction permits movement of the tie bars in a direction inwardly of the housing toward the filter assembly surface. The distal end of each of the pair of tie bars includes a recess therein and an upper mounting portion of a scraper is secured within each of the recesses against movement relative to the tie rods. The scraper also includes a lower scraper portion for providing the required scraping function, and the scraper is movable as a unit with the tie bars to which it is secured when the position of the tie bars is adjusted to adjust the position of the lower scraper portion of the scraper relative to the filter assembly surface.

In the preferred embodiment the scraper adjustment mechanism includes an additional, elongate adjustment member extending through an elongate passage in said inspection cover and rotatable therein. The additional elongate member has a proximal end extending outwardly of the inspection cover for permitting actuation thereof from a location outside of the housing without removal of the cover. The additional elongate member includes a distal end for engaging an upper surface of the scraper to move the scraper in a direction toward the filter assembly surface when the additional, elongate adjustment member is rotated in one direction and for permitting the scraper to be backed away from the filter assembly surface when rotated in an opposite direction.

In the preferred embodiment of this invention the additional, elongate adjustment member is a threaded jack screw member in threaded engagement with threads in the elongate passage in the inspection cover through which the jack screw extends.

In the preferred embodiment, the proximal end of each of the pair of tie bars includes an elongate threaded passage having an open upper end and a lower closed end, and the adjustment mechanism includes rotatable bolts including threaded sections having an elongate dimension shorter than the elongate dimension of the threaded passage and cooperating with the threaded passage for moving the tie bars and the scraper attached thereto in a direction away from the filter assembly surface when the bolts are rotated in one direction and for permitting the tie bars and the scraper attached thereto to be moved in a direction toward the filter assembly surface by rotation of the additional elongate adjustment mechanism in a direction to cause the additional elongate adjustment mechanism to engage and move the scraper when the rotatable bolts are in a loosened position.

This invention also resides in a method of adjusting the distance between a distal edge of a scraper and a filter surface to be cleaned without having any visual access to the scraper edge and the filter surface, both of which are located inside a housing that includes an inspection port closed off by an inspection cover. The method includes the steps of: (a) providing an inspection cover having a projection that passes through the inspection port and wherein a plurality of elongate passageways extend through the inspection cover; (b) providing at least a pair of elongate tie bars extending in the elongate direction through the passageways and being slideably movable therein, said pair of tie bars each including a proximal end and a distal end, said proximal end of each of said pair of tie bars being closest to an outer surface of the filter assembly housing and the distal end of each of said pair of tie bars being closest to said filter assembly surface; said distal end of each of said pair of tie bars including a recess therein; (c) securing an upper mounting portion of a scraper within said recesses of said at least said pair of elongate tie bars, said upper mounting portion being secured within said recesses against movement relative to said tie bars, said scraper having a lower scraper portion including said distal edge, said scraper being movable as a unit with said tie bars when the position of said tie bars is adjusted to adjust the position of the lower scraper portion of the scraper relative to the filter assembly surface; (d) providing a rotatable adjustment mechanism at the proximal end of each of said pair of tie bars, said adjustment mechanisms being rotatable in opposite directions from outside of said filter assembly housing without removal of said inspection cover, whereby rotation in one direction moves said tie bars in a direction outwardly of said housing in a direction away from the filter assembly surface and rotation in an opposite direction permits movement of the tie bars in a direction inwardly of the housing toward said filter assembly surface; (e) including an additional, elongate adjustment member extending through an elongate passage in said inspection cover and rotatable therein, said additional elongate member having a proximal end extending outwardly of said inspection cover for permitting actuation of said additional, elongate adjustment member from a location outside of said housing without removal of said cover, said additional elongate member including a distal end for engaging an upper surface of the scraper to move said scraper in a direction toward said filter assembly surface when said additional, elongate adjustment member is rotated in one direction and for permitting said scraper to be backed away from said filter assembly surface when rotated in an opposite direction; (f) locating said rotatable adjustment mechanism in a position for permitting said scraper to be moved into a position in which the scraper edge engages the filter assembly surface; (g) rotating said additional elongate adjustment member in said one direction to move the scraper toward said filter assembly surface until said scraper edge engages said filter assembly surface; (g) thereafter rotating said additional elongate adjustment member in said opposite direction a predetermined amount to move said additional elongate adjustment member into a position in which a distal end thereof is spaced a predetermined distance from the upper surface of the scraper; and (h) thereafter rotating said rotatable adjustment mechanisms in said one direction to move the scraper away from said filter assembly surface until an upper surface of said scraper engages the distal end of said additional adjustment member.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
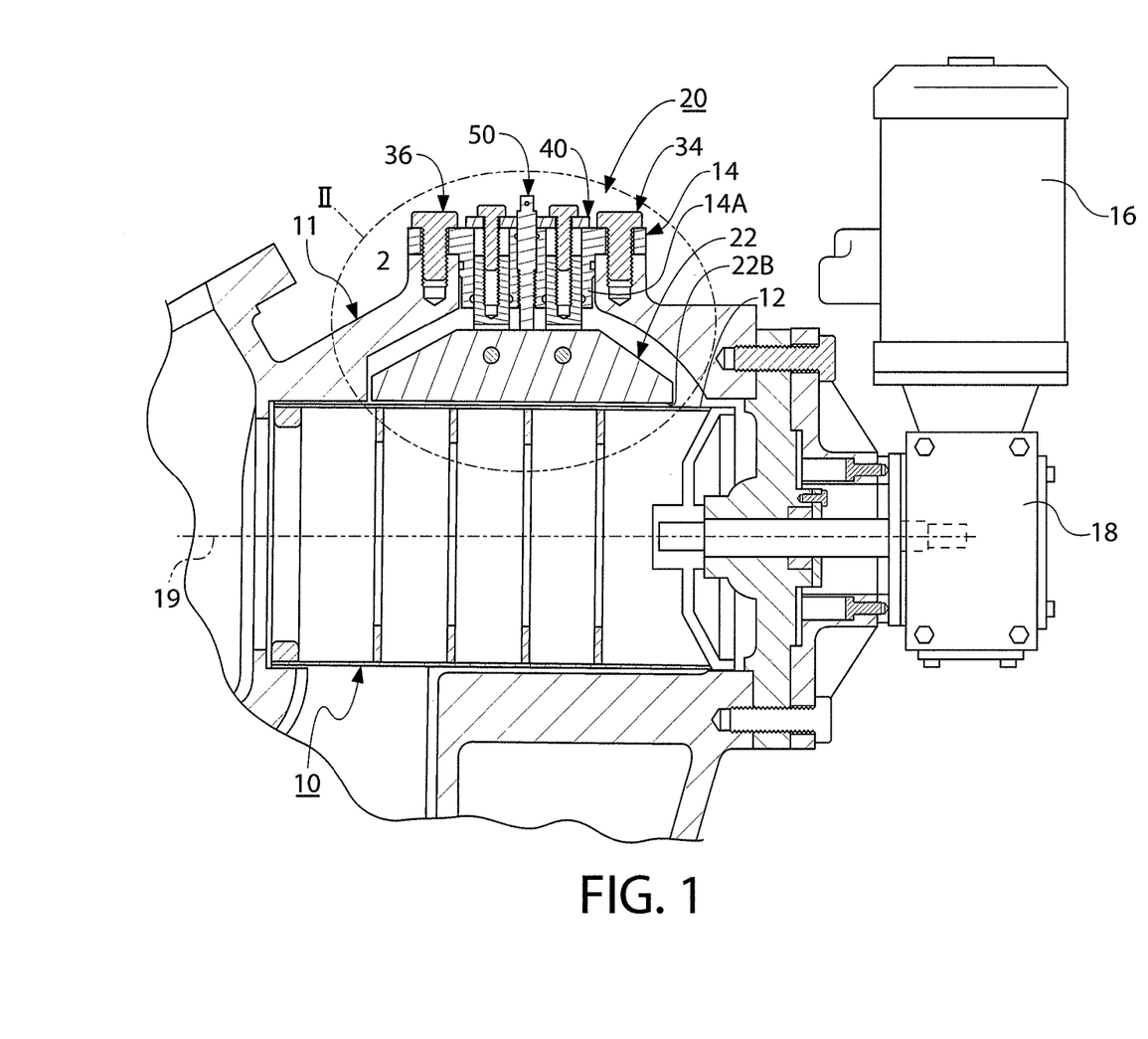
FIG. 1 is a side cross-sectional view of the filter assembly and the scraper adjustment mechanism of the present invention.

Referring to FIG. 1, a scraper adjustment mechanism 20 permits the adjustment of the edge/blade 22B of a scraper 22 with respect to outer surface of a screen 12 forming part of a filter assembly 10. This mechanism 20 provides the ability to adjust the scraper 22 without having to open an inspection cover 14.

Still referring to FIG. 1, the filter assembly 10 is positioned in a fluid flow (not shown), e.g., a fuel oil flow, or a sea water flow used for various cooling operations, or any other type of fluid flow. The filter assembly 10 and the scraper 22 are not visible to an operator that needs to adjust the scraper 22, as they are internal to a filter assembly housing 11. Access can be gained to the filter assembly 10 and scraper through the inspection cover 14 at an inspection port 2. However, as mentioned earlier, the advantage of the present invention 20 is that the scraper 22 can be adjusted without the need to open the inspection cover 14 (or any other housing surface that surrounds the filter assembly 10 and scraper 22) or otherwise have any visual access to the filter assembly 10 and scraper 22.

As used throughout this application, the term "housing surface" is meant to cover any construction, including inspection covers, that obscures the filter assembly 10 and scraper 22 from view so that adjustment of the scraper 22 is being accomplished by the operator essentially "blind."

Also, reference to "scraper" throughout this application, unless indicated otherwise, includes various constructions, including those employing metal edges or brushes to provide the scraping function. However, scraper adjustment problems are less of a concern when the scraper includes a lower brush as opposed to a hard scraper edge since contact actually can, and desirably is, maintained between the distal edges of the brush bristles and the upper surface of the filter assembly during operation of the filter. In distinction, when a hard scraper surface or edge is employed to provide the scraping function it needs to be maintained very close to the filter assembly without engaging or touching the surface thereof in order to provide its desired function. Thus, the scraper adjusting mechanism must be capable of precise and reliable action in the filter construction.

With the scraper edge 22B adjacent the outer surface of the filter screen 12, a motor 16 activates a gear reducer 18 to rotate the screen about the filter assembly's longitudinal axis 19, thereby driving off any particulates from the filter screen 12. The impact of the particulates, among other factors, on the scraper edge 22B over time causes the scraper edge to wear, thereby requiring that the scraper 22 be moved closer to the filter surface 12 to maintain the desired spacing there between.

The present scraper adjustment mechanism 20 is of a simple and reliable design that eliminates or avoids the need to remove the inspection cover 14 to provide adjustment of the scraper 22 and still permits the reliable adjustment of the gap between the scraper edge 22B and the upper surface of the filter screen 12.

Figure 2:
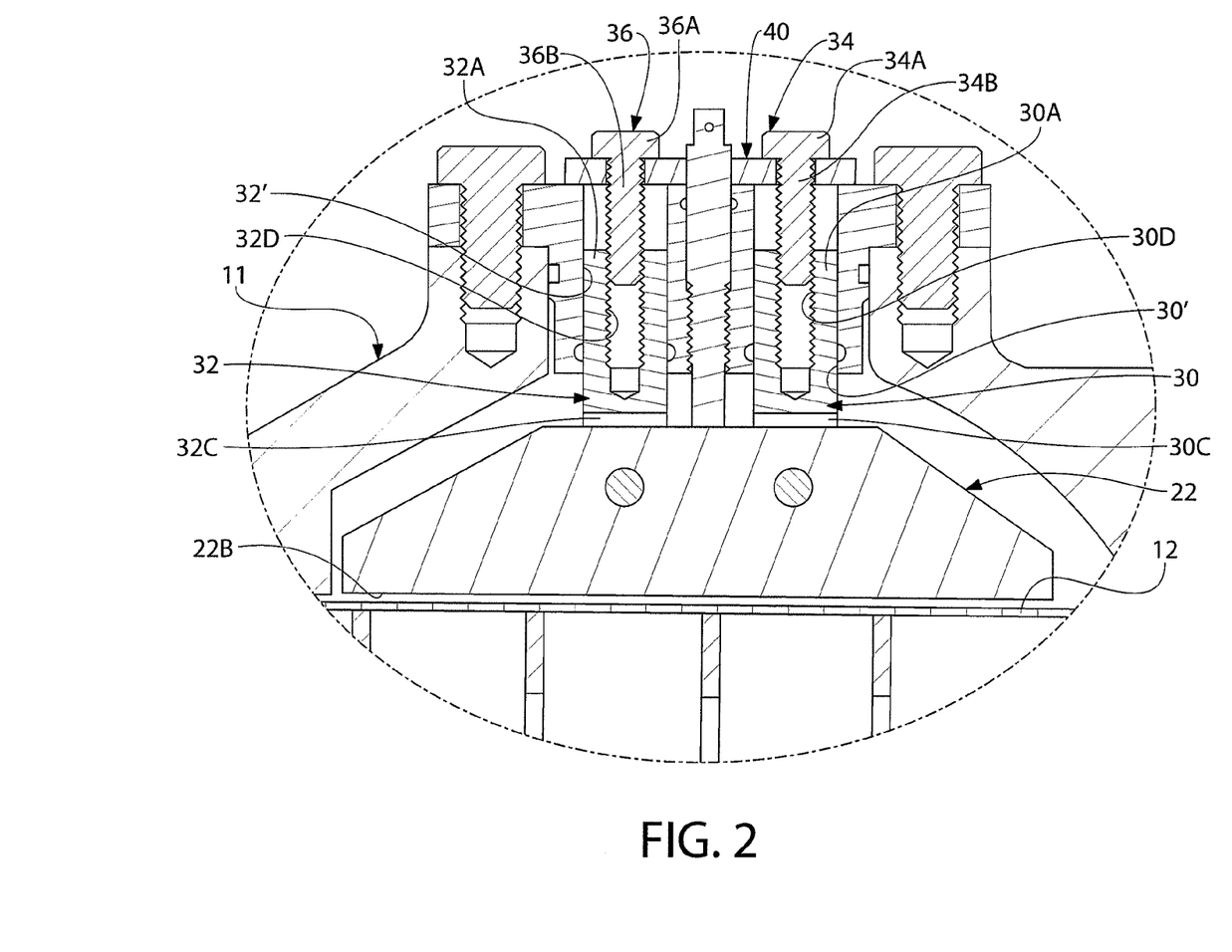
FIG. 2 is an enlarged cross-sectional view of the inspection cover and a portion of the scraper adjustment mechanism of the present invention as indicated at II in FIG. 1.
Figure 3:
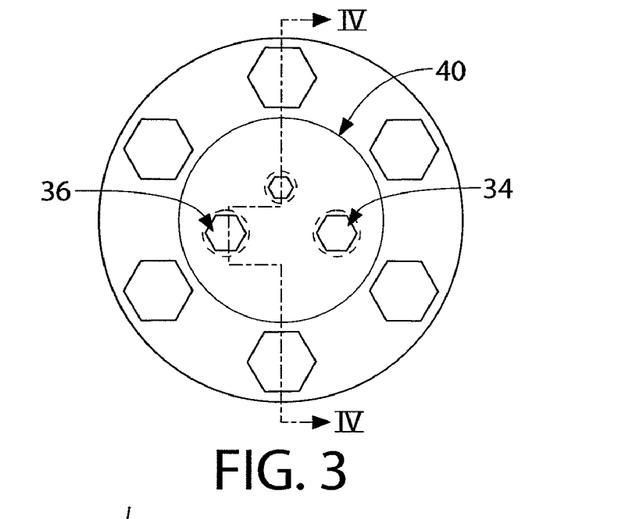
FIG. 3 is a top view of the inspection cover showing the attachment bolts for the cover and the adjustment members for the scraper.
Figure 4:
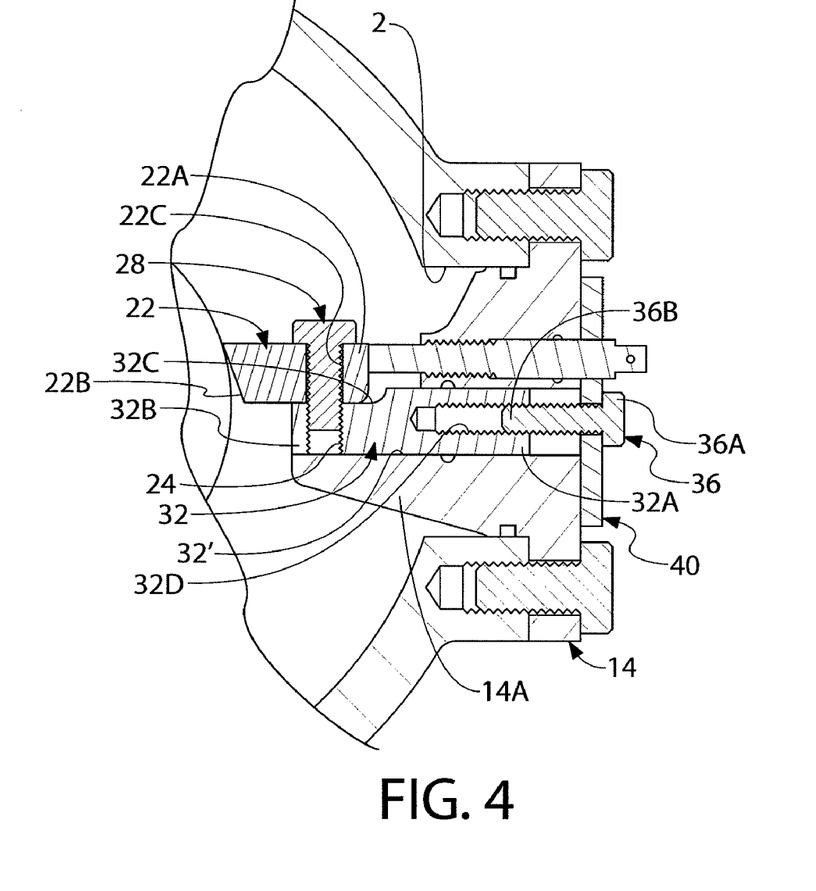
FIG. 4 is an enlarged cross-sectional view of the scraper adjustment mechanism of the present invention taken along line IV-IV of FIG. 3.

As can be seen best in FIGS. 2 and 4, the inspection cover 14 comprises a projection 14A that projects through the inspection opening 2. Spaced apart, elongate tie bars 30, 32 extend through passages 30', 32', respectively in the cover 14 and can be moved axially in said passages. The tie bars 30, 32 include proximal ends 30A, 32A, respectively, and distal ends 30B, 32B, respectively.

Still referring to FIGS. 2 and 4, recesses 30C, 32C are provided at the junction of one of the side walls and the bottom wall of the elongate tie bars 30, 32, respectively, for receiving scraper 22 in a manner that will be described in detail hereinafter.

Still referring to FIGS. 2 and 4, elongate, threaded passages 30D, 32D at the proximal ends of tie bars 30, 32, respectively, receive adjustment members 34, 36, respectively, in the form of threaded bolts. Each of the bolts 34, 36 includes a head section 34A, 36A, respectively, and a threaded stem section 34B, 36B, respectively. The threaded stem sections 34B, 36B cooperate with the threaded passages 30D, 32D in the tie bars 30, 32, respectively, to provide or permit the desired adjustment of the scraper 22, as will be explained in greater detail hereinafter.

As can be seen best in FIGS. 2 and 4, a metal plate 40 is positioned on top of the inspection cover 14 and includes unthreaded passages 40A, 40B extending through said plate and aligned with threaded passages 30D, 32D at the proximal ends of the tie bars 30, 32, respectively, for receiving the adjustment bolts 34, 36 therethrough. It should be noted that the diameters of the passages 40A, 40B are smaller than the diameter of the head sections 34A, 36A of the bolts, to thereby permit the head sections to seat against the upper surface of the plate when in a fully inserted position.

Still referring to FIGS. 2 and 4, the scraper adjustment member 20 further includes an additional elongate adjustment member in the form of a threaded jack screw 50. The threaded jack screw 50 is positioned in an elongate threaded passage 52 extending through cover 14 and includes a proximal end 50A and a distal end 50B terminating in a bottom surface 50C.

As can be seen best in FIGS. 2 and 4, the scraper 22 includes upper mounting portion 22A and a scraper edge 22B at the distal end of a lower scraper portion. Transverse passages 22C extend through the upper mounting portion 22A of the scraper 22 and these latter passages are aligned with threaded passages 24 extending transversely through rear walls of the recesses 30C, 32C, respectively.

A threaded bolt 28 is directed through each of the transverse passages 22C and axially aligned threaded passages 24 (only one being shown in FIG. 4) in the rear walls of the recesses 30C, 32C of scraper 22 to firmly attach the scraper to each of the respective tie bars 30, 32. FIG. 4 shows the attachment of one of the threaded bolts 28 within one of the threaded passages 24 in tie bar 30; it being understood that the other threaded bolt 28 is attached through a respective threaded passage 24 in the other tie bar 32 in an identical manner.

It should be apparent that the above-described method of attaching the scraper 22 to the tie bars 30, 32 prevents relative movement between the tie bars and scraper 22. Stating this another way, the system is designed so that the scraper 22 moves as a unit with the tie bars 30, 32 during the adjustment operation, as will be described in greater detail hereinafter.

As described above, it is necessary to adjust the position of the scraper 22 relative to the screen 12 when the spacing between the scraper edge and the outer surface of screen 12 becomes too great. This can occur due to wear of the scraper edge resulting from the continuous use of the filter, and also prior to the initial setup of the filter prior to operation thereof.

Referring to FIGS. 5A-5E, sequential steps in the adjustment method will now be described.

Figure 5A:
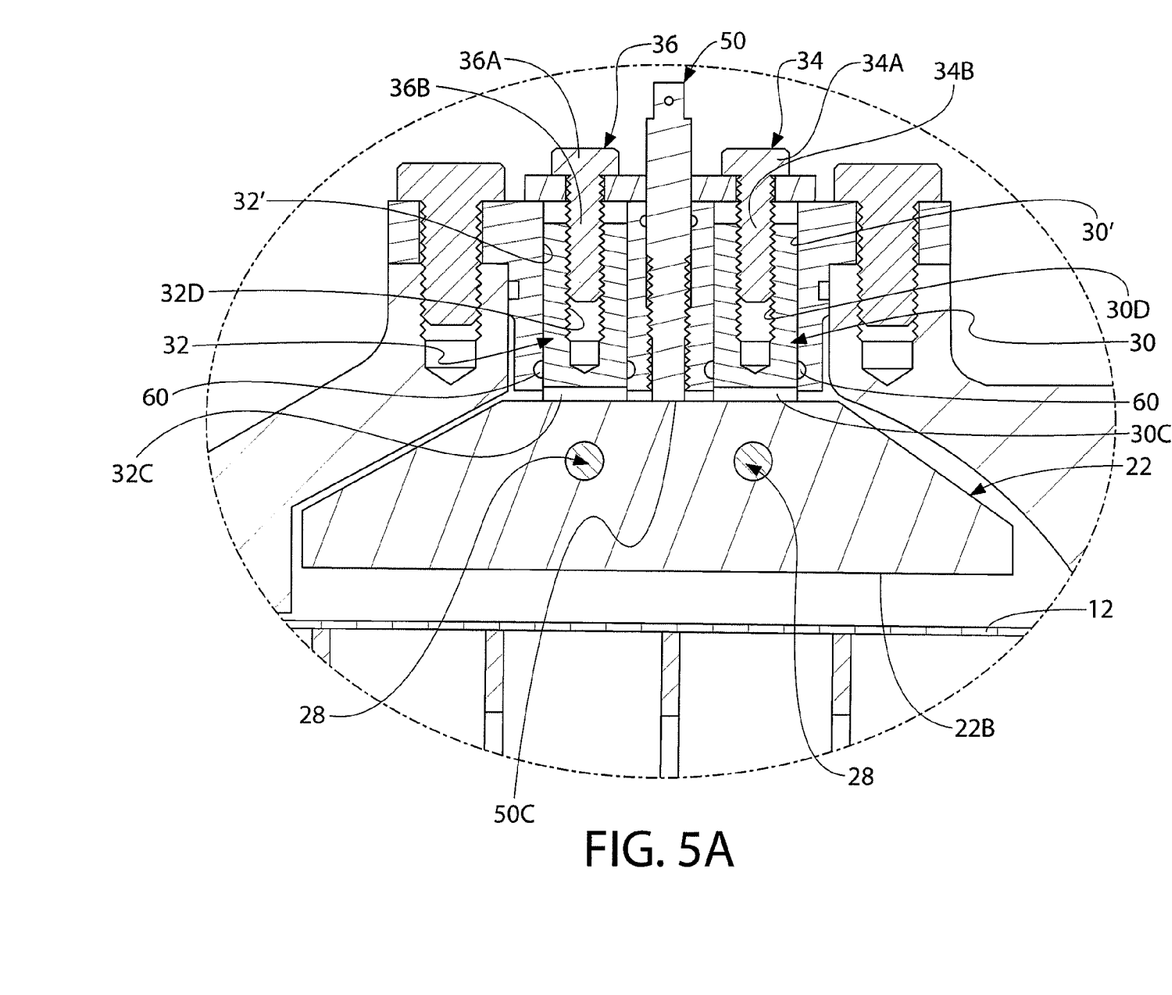
FIGS. 5A-5E show sequential steps in positioning the scraper relative to the filter assembly in accordance with the method of this invention.

Referring to FIG. 5A, the scraper 22 is shown in a fixed, position wherein the gap between the scraper edge 22B and the outer surface of the screen 12 is greater than is desired. The spacing between the edge 22B and the screen 12 is greatly exaggerated in FIG. 5A for ease of description and understanding; it being understood that the excess spacing or gap that actually exists can result from the wear of the scraper edge 22B during use of the filter or prior to initial adjustment of the scraper edge relative to the surface of the filter assembly.

Figure 5B:
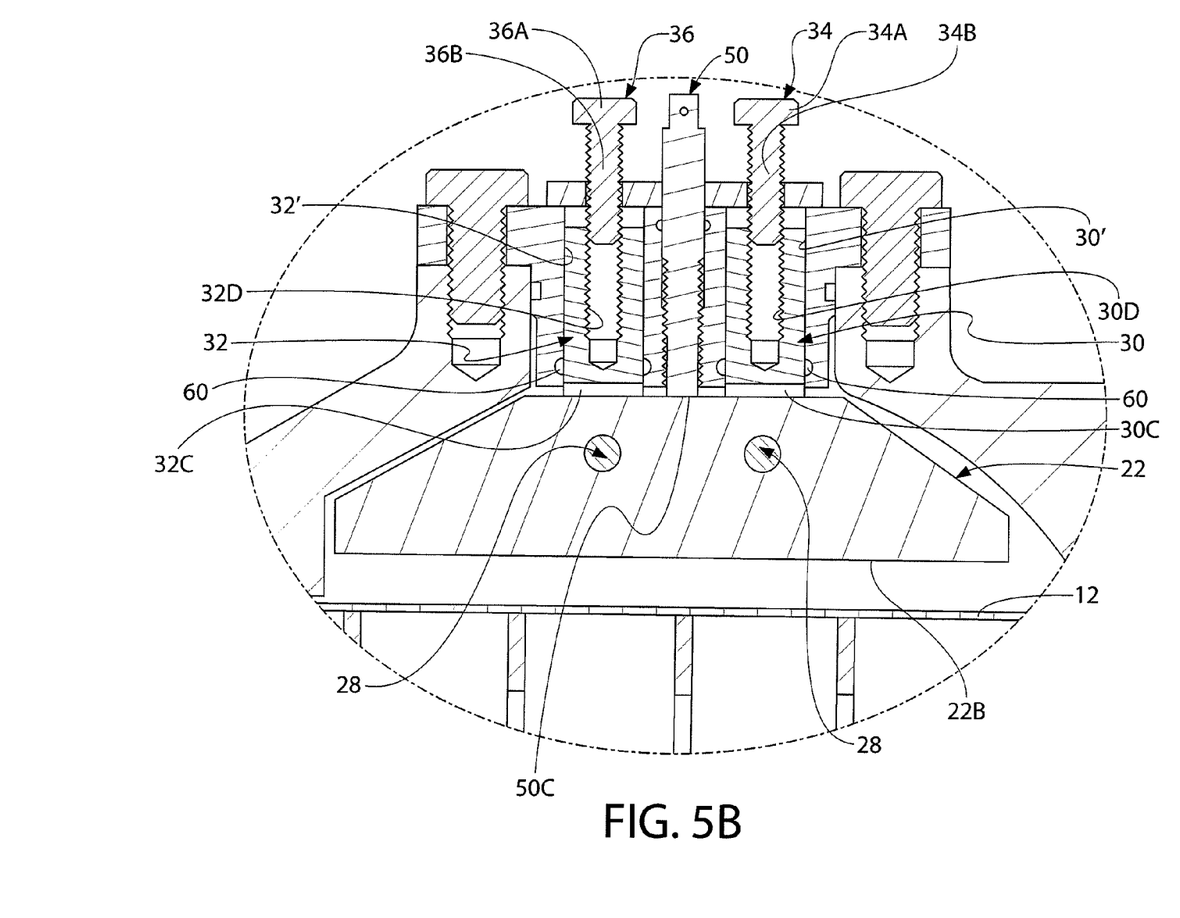

Referring to FIG. 5B, the first step in the adjustment operation is to rotate threaded bolts 34, 36 in a direction to move them outwardly of the threaded passages 30D, 32D at the proximal ends of the tie bars 30, 32. In this condition, the tie bars 30, 32 and the scraper 20 attached thereto are capable of being moved axially within the passages 30', 32" in the cover 14. However, this axial movement requires that a positive force be exerted on the scraper 22 since the scraper is maintained in its unadjusted position by the frictional engagement with one or more seals, e.g., seal 60.

Figure 5C:
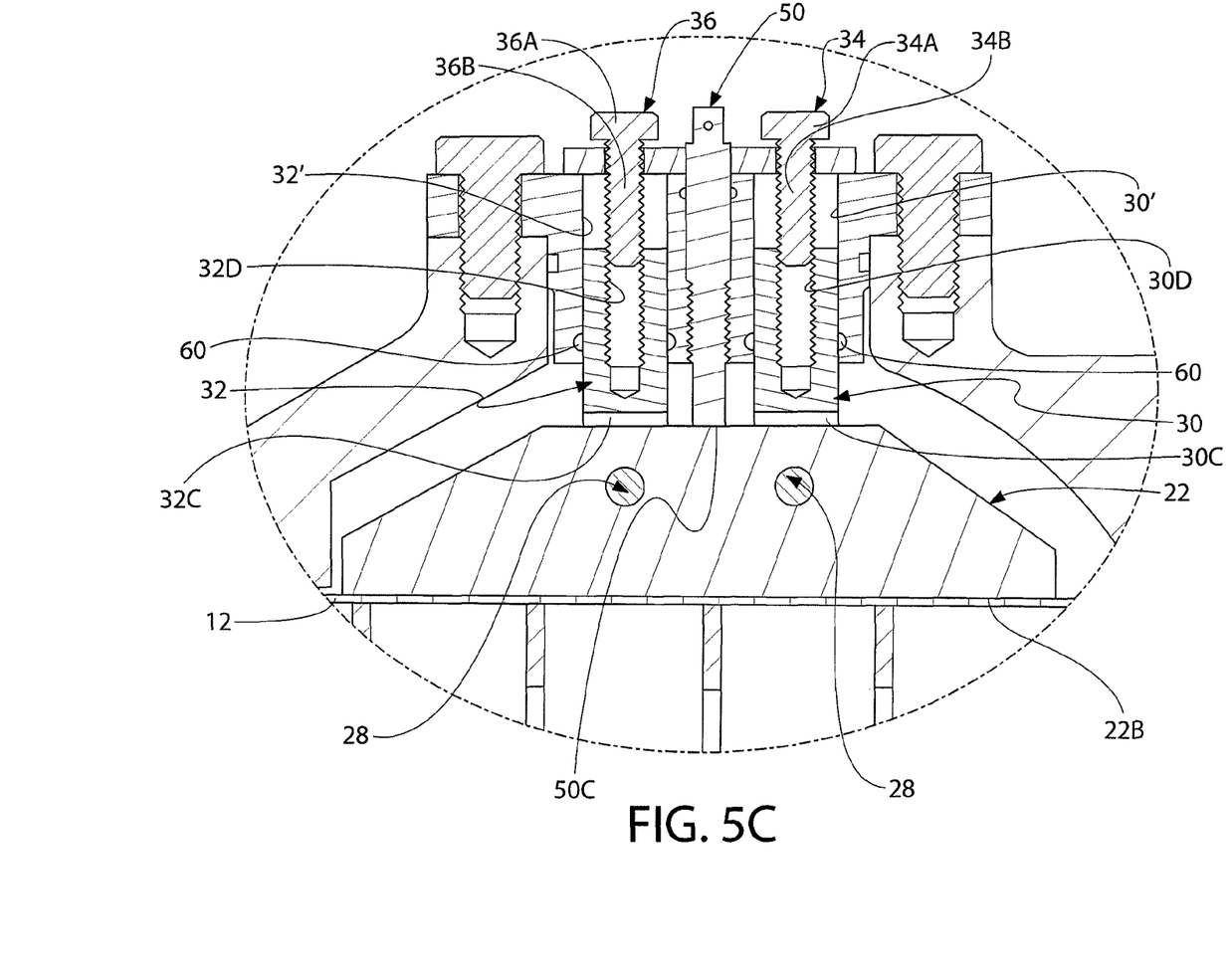

To affect the downward movement of the scraper 22 relative to the outer surface of the screen 12 the jack screw 50 is rotated to cause it to move inwardly and thereby cause the bottom surface 50C thereof to push against the upper surface of the scraper 22 in a direction to move the scraper inwardly to a position wherein the edge 22B of the scraper makes contact with the outer surface of the screen 12. This position is illustrated in FIG. 5C. A skilled operator will be able to tactically determine when the edge 22B of the scraper 22 engages the screen 12 based on the resistance to further movement provided when such contact takes place. This also causes the tie rods 30, 32 and the adjustment bolts 34, 36 to move inwardly the same distance as the scraper 22 is moved inwardly.

Figure 5D:
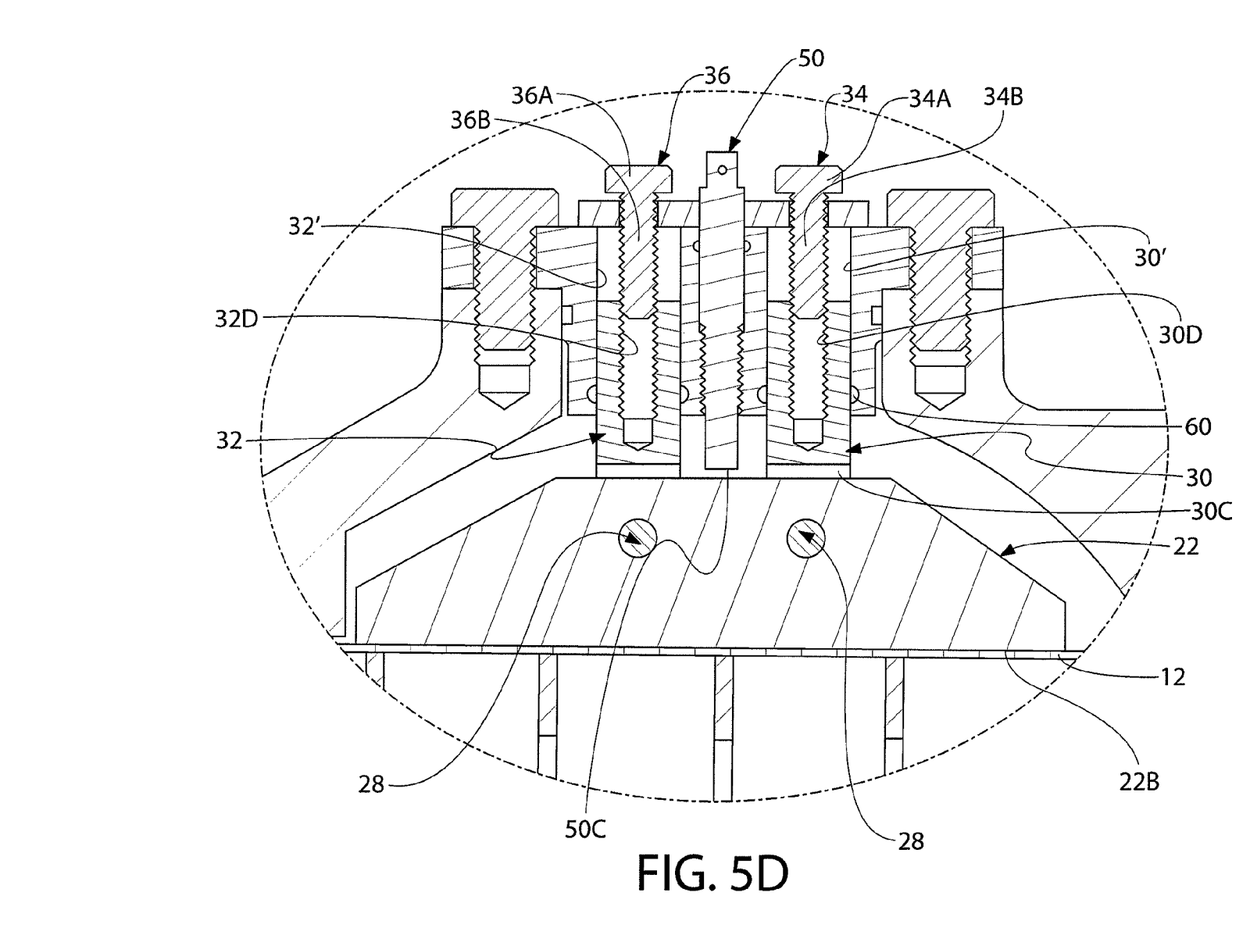

Referring to FIG. 5D after the distal edge 22B of the scraper 22 engages the screen 12 the jack screw 50 is rotated in the opposite direction a predetermined number of revolutions (e.g., one-quarter of a revolution, one half of a revolution, one revolution, etc.) depending upon the desired spacing between the scraper edge 22B and the upper surface of the screen 12. In other words, an operator will be given, or will know the correlation between the rotational movement of the jack screw 50 and the corresponding axial movement caused thereby. In this position the heads of the adjustment bolts 34, 36 are out of engagement with the upper surface of the plate 40 and therefore have the capability of being screwed into the threaded passages 30D, 32D in the tie bars 30, 32.

Figure 5E:
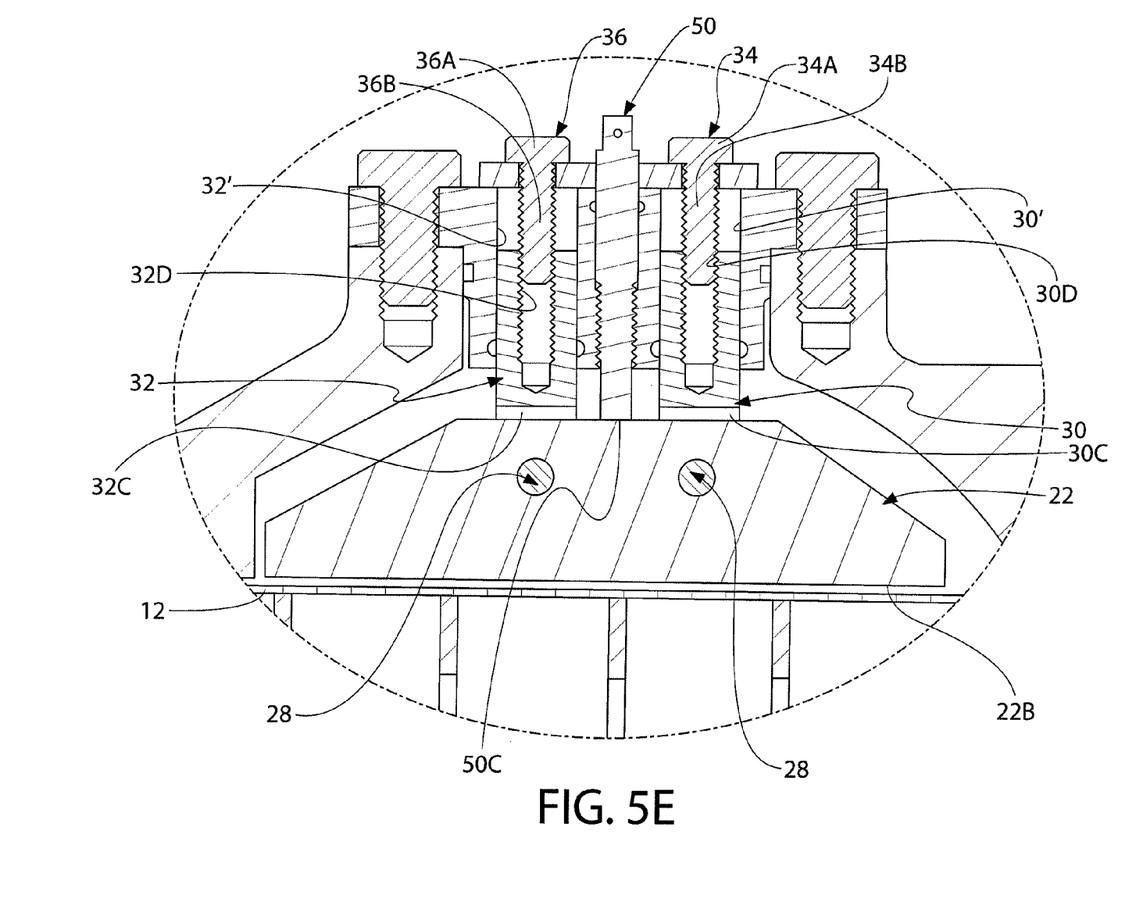

Referring to FIG. 5E, after the jack screw 50 has been backed off of the upper surface of the scraper 22 a desired distance, as shown in FIG. 5D, it is then necessary to move the scraper 22 into engagement with the bottom surface 50C of said jack screw to properly set the position of the scraper edge 22B with the upper surface of the filter assembly 10. This is accomplished by rotating the adjustment members 34, 36 an equal number of turns in a direction to tighten the member 34, 36 against upper plate 40, and thereafter, through continued tightening rotation, force or pull the scraper 22 attached to the tie rods 30, 32 to move outward of the screen 12 to a position wherein the upper surface of the scraper engages the bottom surface 50C of the jack screw. In this position the scraping edge 22B is positioned a desired distance from the outer surface of the screen 12 of the filter assembly 10.

The present invention has numerous advantages over prior art constructions.

First, the reliable mounting of the scraper 22 to each of the tie rods 30, 32 prevents relative movement between the scraper 22 and the tie rods and also provides a very reliable and simple system for adjusting the position of the scraper 22 relative to the outer surface of screen 12 of the filter assembly 10.

Second the manner of achieving the adjustment of the scraper 22 relative to the filter assembly 10 is extremely simple and reliable, requiring less moving parts than prior art constructions.

The scraper adjustment mechanism 10 of this invention can be employed in a variety of different commercial and military applications, but is most beneficially used in systems wherein the filter assembly 10 is designed to rotate in a single direction during use.

When the present invention is used in harsh water environments (e.g., sea water), the components of the scraper adjustment mechanism 20 (e.g., the scraper, tie bolts, jack screw, etc.) may comprise a nickel/copper alloy material, e.g., Monel® metal. The inspection cover 14 may comprise an aluminum/bronze material. The specific materials employed for the scraper adjustment mechanism 20 and the inspection cover 14 do not constitute a limitation on the broadest aspects of this invention.

While the invention has been described in detail and with reference to specific examples thereof, it will be apparent to one skilled in the art that various changes and modifications can be made therein without departing from the spirit and scope thereof.

What is claimed is:

1. A scraper adjustment mechanism for adjusting the distance between an edge of a scraper and a filter assembly surface positioned in a filter assembly housing and wherein the housing includes an inspection port, said scraper adjustment mechanism comprising:
   a. an inspection cover comprising a projection that passes through the inspection port when said cover is installed at said inspection port, said inspection cover further including a plurality of passageways from a first surface to a second opposite surface of said inspection cover;
   b. at least a pair of elongate tie bars extending in said elongate direction through said passageways and being slideably movable therein;
   c. said pair of tie bars each including a proximal end and a distal end, said proximal end of each of said pair of tie bars being closest to an outer surface of the filter assembly housing and the distal end of each of said pair of tie bars being closest to said filter assembly surface;
   d. an adjustment mechanism at the proximal end of each of said pair of tie bars and being actuatable by rotation in opposite directions from outside of said filter assembly housing without removal of said inspection cover, whereby rotation in one direction moves said tie bars in a direction outwardly of said housing in a direction away from the filter assembly surface and rotation in an opposite direction permits movement of the tie bars in a direction inwardly of the housing toward said filter assembly surface;
   e. said distal end of each of said pair of tie bars including a recess therein;
   f. a scraper having a lower scraper portion and an upper mounting portion, said upper mounting portion being secured within said recess against movement relative to said tie bars, said scraper being movable as a unit with said tie bars when the position of said tie bars is adjusted to adjust the position of the lower scraper portion of the scraper relative to the filter assembly surface.

2. The scraper adjustment mechanism of claim 1, further including an additional, elongate adjustment member extending through an elongate passage in said inspection cover and rotatable therein, said additional elongate member having a proximal end extending outwardly of said inspection cover for permitting actuation of said additional, elongate adjustment member from a location outside of said housing without removal of said cover, said additional elongate member including a distal end for engaging an upper surface of the scraper to move said scraper in a direction toward said filter assembly surface when said additional, elongate adjustment member is rotated in one direction and for permitting said scraper to be backed away from said filter assembly surface when rotated in an opposite direction.

3. The scraper adjustment mechanism of claim 2, wherein said additional, elongate adjustment member is a threaded screw member with threads of said screw member being in threaded engagement with threads in said elongate passage in said inspection cover through which said screw member extends, whereby rotation of said screw member in said one direction moves said screw member inwardly in said housing to engage the upper surface of said scraper and move said scraper inwardly toward said filter assembly surface when said adjustment members are in a loosened position for permitting inward movement of said scraper.

4. The scraper adjustment mechanism of claim 2 wherein said proximal end of each of said pair of tie bars includes an elongate threaded passage having an open upper end and a lower closed end, said adjustment mechanism including rotatable bolts, each having a threaded section having an elongate dimension shorter than the elongate dimension of the threaded passage and cooperating with said threaded passage for moving said tie bars and the scraper attached thereto in a direction away from said filter assembly surface when said bolt is rotated in one direction and for permitting the tie bars and the scraper attached thereto to be moved in a direction toward said filter assembly surface by rotation of said additional elongate adjustment mechanism in said one direction with said rotatable bolts in a loosened position to permit movement of the tie bars and the scraper attached thereto in a direction toward the filter assembly surface.

5. The scraper adjustment mechanism of claim 1 wherein said scraper portion and said upper mounting portion are integrally formed.

6. A method of adjusting the distance between an distal edge of a scraper and a filter surface to be cleaned without having any visual access to the scraper edge and the filter surface, both of which are located inside a housing that includes an inspection port closed off by an inspection cover, said method comprising the steps of:

a. providing an inspection cover comprising a projection that passes through the inspection port when said cover is installed at said inspection port, said inspection cover further including a plurality of passageways from a first surface to a second opposite surface of said inspection cover;

b. providing at least a pair of elongate tie bars extending in said elongate direction through said passageways and being slideably movable therein, said pair of tie bars each including a proximal end and a distal end, said proximal end of each of said pair of tie bars being closest to an outer surface of the filter assembly housing and the distal end of each of said pair of tie bars being closest to said filter assembly surface; said distal end of each of said pair of tie bars including a recess therein;

c. securing an upper mounting portion of a scraper within said recess of said at least said pair of elongate tie bars, said scraper having a lower scraper portion including said distal edge, said upper mounting portion being secured within said recess against movement relative to said tie bars, said scraper being movable as a unit with said tie bars when the position of said tie bars is adjusted to adjust the position of the lower scraper portion of the scraper relative to the filter assembly surface;

d. providing a rotatable adjustment mechanism at the proximal end of each of said pair of tie bars, said adjustment mechanisms being rotatable in opposite directions from outside of said filter assembly housing without removal of said inspection cover, whereby rotation in one direction moves said tie bars in a direction outwardly of said housing in a direction away from the filter assembly surface and rotation in an opposite direction permits movement of the tie bars in a direction inwardly of the housing toward said filter assembly surface;

e. including an additional, elongate adjustment member extending through an elongate passage in said inspection cover and rotatable therein, said additional elongate member having a proximal end extending outwardly of said inspection cover for permitting actuation of said additional, elongate adjustment member from a location outside of said housing without removal of said cover, said additional elongate member including a distal end for engaging an upper surface of the scraper to move said scraper in a direction toward said filter assembly surface when said additional, elongate adjustment member is rotated in one direction and for permitting said scraper to be backed away from said filter assembly surface when rotated in an opposite direction;

f. maintaining said rotatable adjustment mechanism in a position for permitting said scraper to be moved into a position in which the scraper edge engages the filter assembly surface;

g. rotating said additional elongate adjustment member in said one direction to move the scraper toward said filter assembly surface until said scraper edge engages said filter assembly surface;

h. thereafter rotating said additional elongate adjustment member in said opposite direction a predetermined amount to move said additional elongate adjustment member into a position in which a distal end thereof is spaced a predetermined distance from the upper surface of the scraper; and i. thereafter rotating said rotatable adjustment mechanisms in said one direction to move the scraper away from said filter assembly surface until an upper surface of said scraper engages the distal end of said additional adjustment member.

* * * * *